Jan. 3, 1939.  G. S. CLENDENIN  2,142,497
PROPELLER SHAFT FOR AUTOMOBILES
Filed Aug. 20, 1936
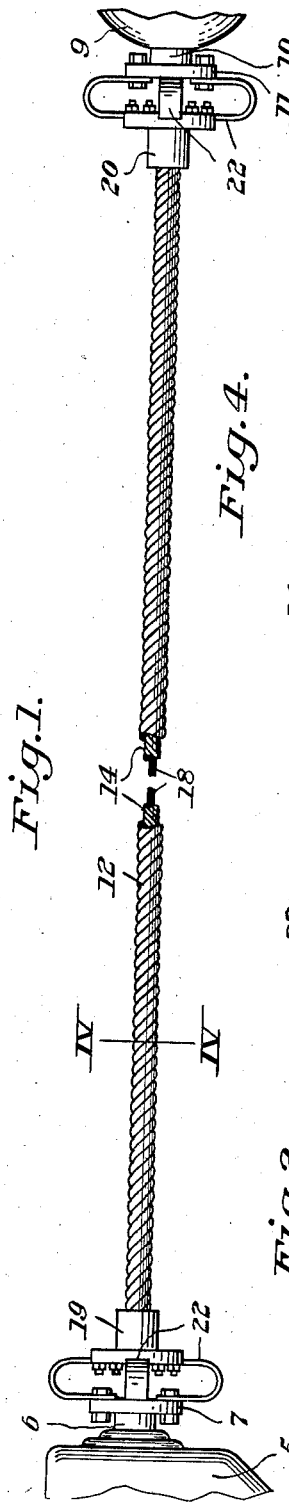
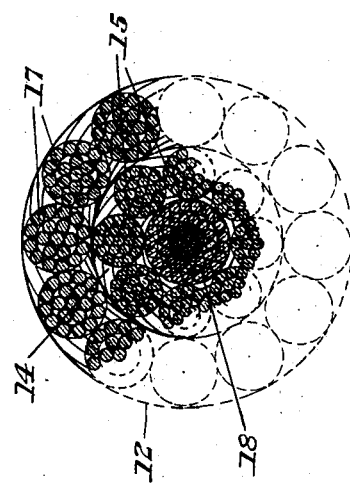
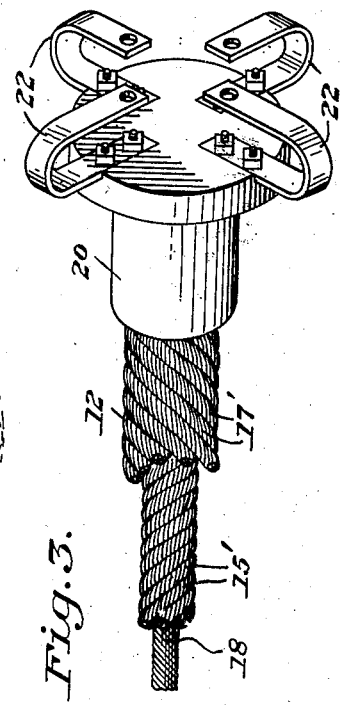
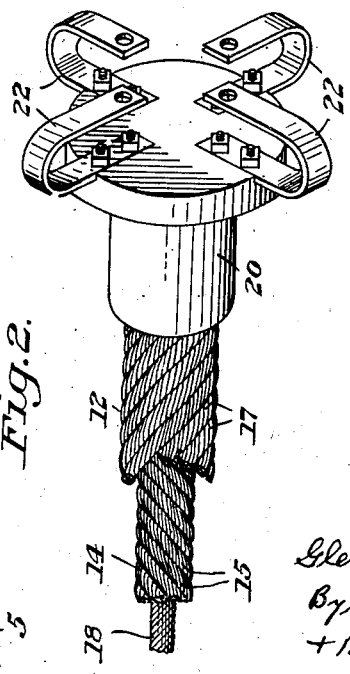
INVENTOR
Glenn Scott Clendenin,
By Stebbins, Blenko
+ Parmelee, Attys

UNITED STATES PATENT OFFICE 2,142,497

PROPELLER SHAFT FOR AUTOMOBILES

Glenn Scott Clendenin, Pittsburgh, Pa., assignor of one-half to Leonard S. Mudge, Pittsburgh, Pa.

Application August 20, 1936, Serial No. 96,996

1 Claim. (Cl. 64—2)

This invention relates to a flexible shaft, and more particularly to a propeller shaft which may be used for propelling an automobile or for an analogous use.

In the accompanying drawing which illustrates my invention:

Figure 1 is a view in side elevation of such a propeller shaft connecting the engine of an automobile with the rear axle;

Figure 2 is a perspective view of the connecting means at one end of the propeller shaft;

Figure 3 is a similar view of a flexible shaft whose component elements are twisted in the opposite direction from the corresponding elements in the embodiment shown in Figure 2, so that the normal direction of drive may be in the opposite direction; and Figure 4 is a section on the line IV—IV of Figure 1.

In Figure 1, the numeral 5 indicates the gear casing of an automobile engine with the driving shaft projecting as indicated at 6. This shaft is provided with a flange 7. The numeral 9 indicates the differential housing of the rear axle on the automobile having a pinion shaft 10 projecting therefrom. This pinion shaft is also provided with a flange 11.

According to conventional construction, a rigid shaft connects the drive shaft 6 with the pinion shaft 10; and inasmuch as the rear axle rises and falls independently of the engine, which is supported on the springs of the automobile, and inasmuch as it is frequently the case that the drive shaft 6 is normally out of line with the pinion shaft 10, a universal joint is customarily provided at both ends of the rigid propeller shaft to connect this shaft with the drive shaft 6 and the pinion shaft 10, respectively.

In accordance with my invention, the need for these universal joints at the two ends of the propeller shaft is done away with, a flexible shaft replacing the above mentioned rigid propeller shaft.

Referring more particularly to Figures 2, 3 and 4, it will be noted that the flexible shaft 12 comprises a flexible cable having inner and outer component elements, the inner elements being twisted in the opposite direction from the outer elements. I prefer to employ a flexible cable made up of smaller component cables of which a plurality are laid about an inner or core cable. In the embodiment shown in Figures 1 and 2, the core cable 14 comprises a plurality of strands 15, twisted in one direction, while a plurality of component cables 17 are laid about this core cable in the opposite direction. The direction of rotation of the shaft 6 for normal driving is such that the pitch of the component cables 17 should be a right-hand pitch, while the pitch of the strands 15 should be left-hand. If, however, it is desired to employ such a flexible shaft where the normal direction of drive is in the opposite direction, the strands should have a right-hand pitch, as indicated at 15' in Figure 3, and the small component cables should have a left-hand pitch, as indicated at 17' in the same figure. In order to equalize the strains in the flexible shaft the component cables 17 or 17' should be laid on the core cable 14 at the same pitch, but in the opposite direction, as the pitch of the strands 15 or 15' of the core cable.

I twist the strands 15 about a core strand 18 of steel wires, and thereby avoid the tendency to kink which is noticeable with a hemp or other non-metallic core. I believe the cable, as I make it for use in a propeller shaft, to be novel per se as I find that a cable made up of steel, including even the core, is better suited to my purpose than more flexible cables customarily sold for hoisting purposes or the like.

The steel, which may be in the form of cold drawn steel wires, should have a sufficiently large carbon content to take a temper. If the steel is so soft as to be incapable of taking a temper, it does not function as well in the flexible cable as I employ it. It is not necessary that a content as high as that for spring steel be employed, but I prefer that the component elements of the flexible shaft be tempered steel strands or small cables.

In assembling the propeller shaft, the flexible shaft 12 is welded into socket members 19 and 20 at the respective ends of the shaft. Before thus securing the ends of the flexible shaft in the sockets, it is necessary to place the component elements under torsion as follows:

The inner or core cable 15 or 15' is placed under a greater torsion than it is ever intended to carry during driving. The component cables 17 or 17' are then reversely laid on the core cable. The ends of the cables 15 and 17 or 15' and 17' are then welded in the socket members 19 and 20 before the torque is released.

With the rise and fall of the rear axle, there is a certain amount of elongation of the distance between the shaft 6 and the pinion shaft 10. In order to provide the required elongation in the propeller shaft, I connect the socket members 19 and 20 to the flanges 7 and 11, respectively, by resilient elements 22, which are preferably U- shaped and have each a leg secured to the respective socket member.

In the preferred embodiment illustrated in the drawing, the elements 22 consist of strips which are bowed outwardly in a plane passing through the axis of the shaft. Accordingly the legs of each element are substantially radially disposed. These U-shaped elements afford sufficient resilience to take care of the changes in the distance between the shafts 6 and 10; but torque is transmitted by these elements, without substantial deflection of the same, because of the lateral stiffness inherent in a strip.

The elements 22 may be welded to the end faces of the socket members; but in order to make them replaceable, I prefer to attach them in recesses in the socket members by means of stud bolts. The other leg of each element is secured to the flange 7 or 11, as the case may be, by a bolt.

One advantage of my invention is that the rear axle of an automobile so connected to the drive shaft can move up and down due to the usual unevenness in the road, without strain on parts connected to the propeller shaft. The elements 22 flex sufficiently to give the necessary elongation when the rear axle moves up and down. The use of the elements at both ends of the propeller shaft is of considerable advantage because it balances the stresses due to the drive through the propeller shaft.

A further advantage in the flexible shaft, whether employed as a part of the drive of an automobile or to serve as a driving connection in some other relation, is that the permanent torsion in the flexible cable does away with the lengthening and shortening of the cable which would normally be expected due to change in torque.

While I have specifically illustrated the application of my invention to the propeller shaft of an automobile, it will be apparent that its usefulness is not thus limited. In other words, although I have illustrated and described the embodiment of my invention which at present I find most useful, it will be understood that the invention may be otherwise embodied and practiced within the scope of the following claim.

I claim:

Power transmission mechanism adapted for transmission of driving power in automobiles and the like, comprising an elongated flexible shaft comprising a solid core strand, a plurality of strands twisted spirally about said core strand to form a layer thereabout and a plurality of other strands twisted spirally about said layer of opposite hand to the strands of said layer, the strands of said layer and said last mentioned plurality of strands being maintained under torsion and having their corresponding ends held against movement relatively to one another.

GLENN SCOTT CLENDENIN.